United States Patent
Borovikov et al.

(10) Patent No.: US 12,477,639 B2
(45) Date of Patent: Nov. 18, 2025

(54) SYSTEM AND METHODS FOR AUTOMATED LIGHT RIGGING IN VIRTUAL INTERACTIVE ENVIRONMENTS

(71) Applicant: Electronic Arts Inc., Redwood City, CA (US)

(72) Inventors: Igor Borovikov, Foster City, CA (US); Inna Cherneykina, Foster City, CA (US)

(73) Assignee: Electronic Arts Inc., Redwood City, CA (US)

(*) Notice: Subject to any disclaimer, the term of this patent is extended or adjusted under 35 U.S.C. 154(b) by 65 days.

(21) Appl. No.: 18/619,039

(22) Filed: Mar. 27, 2024

(65) Prior Publication Data

US 2024/0334573 A1   Oct. 3, 2024

Related U.S. Application Data

(60) Provisional application No. 63/455,719, filed on Mar. 30, 2023.

(51) Int. Cl.
*H05B 47/155* (2020.01)
*H05B 47/11* (2020.01)
*H05B 47/165* (2020.01)
*H05B 47/175* (2020.01)

(52) U.S. Cl.
CPC ........ *H05B 47/155* (2020.01); *H05B 47/11* (2020.01); *H05B 47/165* (2020.01); *H05B 47/1985* (2024.01)

(58) Field of Classification Search
CPC .... H05B 47/155; H05B 47/11; H05B 47/165; H05B 47/1985
See application file for complete search history.

(56) References Cited

U.S. PATENT DOCUMENTS

| | | | |
|---|---|---|---|
| 11,361,519 B1* | 6/2022 | Kanno | G06F 3/0481 |
| 11,585,515 B2* | 2/2023 | Pickard | G02B 6/0045 |
| 11,635,188 B2* | 4/2023 | Pickard | H05B 45/20 |
| | | | 315/149 |
| 11,751,315 B2* | 9/2023 | Ekkel | H05B 47/1985 |
| | | | 315/152 |
| 11,871,494 B1* | 1/2024 | Huang | H05B 45/20 |
| 11,889,603 B2* | 1/2024 | Coleman | G01S 17/86 |
| 12,011,661 B1* | 6/2024 | Liu | G06V 20/40 |
| 12,114,406 B2* | 10/2024 | Ajmeer | H05B 47/175 |

(Continued)

FOREIGN PATENT DOCUMENTS

| | | | | |
|---|---|---|---|---|
| CN | 117948896 A | * | 4/2024 | G01B 11/02 |
| CN | 118736338 A | * | 10/2024 | G06V 10/82 |

(Continued)

*Primary Examiner* — Adam D Houston
(74) *Attorney, Agent, or Firm* — Knobbe, Martens, Olson & Bear, LLP (57) ABSTRACT

An automated light rigging system (ALRS) that adjusts, or creates, light rigs that more accurately causes lighting from light rigs and light objects to conform to, or more closely conform with, target lux values of a target lux map for one or more regions of a virtual interactive environment. The ALRS can receive light rig data to sample lux values of the virtual interactive environment to determine where a loss or discrepancy of luminance occurs among the virtual interactive environment, based at least in part on a target lux map.

20 Claims, 6 Drawing Sheets

(56) References Cited

U.S. PATENT DOCUMENTS

| | | | |
|---|---|---|---|
| 12,267,929 B1* | 4/2025 | Li | H05B 45/20 |
| RE50,468 E * | 6/2025 | Knapp | H05B 45/22 |
| 2015/0050994 A1* | 2/2015 | Mangold | A63F 13/95 |
| | | | 463/31 |
| 2016/0110838 A1* | 4/2016 | Humphries | G06T 1/005 |
| | | | 382/100 |
| 2021/0127475 A1* | 4/2021 | Bessems | H05B 47/1965 |
| 2022/0299190 A1* | 9/2022 | Chemel | F21V 29/763 |
| 2022/0309756 A1* | 9/2022 | Kanno | G06F 3/0481 |
| 2023/0025585 A1* | 1/2023 | Palacios | G06T 19/20 |
| 2023/0087854 A1* | 3/2023 | Yu | G06F 3/0481 |
| | | | 367/117 |
| 2023/0199933 A1* | 6/2023 | Graff | H05B 47/155 |
| | | | 315/70 |
| 2024/0288842 A1* | 8/2024 | Abraham | G05B 15/02 |
| 2024/0334573 A1* | 10/2024 | Borovikov | H05B 47/1985 |

FOREIGN PATENT DOCUMENTS

| | | | | |
|---|---|---|---|---|
| CN | 120130125 A * | 6/2025 | | H05B 47/155 |
| EP | 3424281 B1 * | 4/2024 | | H05B 47/19 |
| EP | 4366471 A1 * | 5/2024 | | H05B 47/155 |
| KR | 102551454 B1 * | 7/2023 | | H05B 47/11 |
| WO | WO-2019084387 A1 * | 5/2019 | | H05B 47/125 |
| WO | WO-2024231323 A1 * | 11/2024 | | H05B 47/155 |

* cited by examiner

SYSTEM AND METHODS FOR AUTOMATED LIGHT RIGGING IN VIRTUAL INTERACTIVE ENVIRONMENTS

CROSS REFERENCE TO RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Lighting is a prominent and complex aspect of computer graphics. The inclusion and configuration of lights in virtual interactive environments is a difficult task that is only further compounded by subjective and computational goals for lighting. As such, systems and methods for automated light placement and configuration in virtual interactive environments would be advantageous in the field of computer graphics.

SUMMARY

The present disclosure includes techniques described herein that relate to a system including: one or more processors; and one or more memory devices, wherein the one or more memory devices are communicatively coupled to the one or more processors, the one or memory devices storing computer-executable instructions including at least an automated light rigging system, wherein execution of the computer-executable instructions by the one or more processors causes, during runtime, at least one of the one or more processors to configure a light rig of a virtual interactive environment by: receiving light rig data of the virtual interactive environment, the light rig data corresponding to a plurality of light objects configured among the virtual interactive environment; receiving a lux map corresponding to a light view rendering of the virtual interactive environment, wherein the light view rendering is based at least in part on the light rig data; sampling lux values from the lux map across one or more regions of the virtual interactive environment; identifying at least one region where the sampled lux map does not conform with a target lux map; determining one or more light objects, among the plurality of light objects of the light rig, providing luminance to the at least one region identified; and adjusting one or more parameters corresponding to the one or more light objects to alter the luminance at the at least one region identified, wherein the adjustment causes luminance at the at least one region of the virtual interactive environment to conform with the target lux map.

In some aspects, the techniques described herein relate to a system, wherein the target lux map includes data corresponding to optimal lux values for the virtual interactive environment.

In some aspects, the techniques described herein relate to a system, wherein the target lux map is based in part on another virtual interactive environment.

In some aspects, the techniques described herein relate to a system, wherein the determination of the one or more light object is based in part on data from the lux map.

In some aspects, the techniques described herein relate to a system, wherein the adjusting of one or more parameters causes the one or more light objects to change at least one parameter corresponding to location, rotation, scale, direction, and luminous intensity.

In some aspects, the techniques described herein relate to a system, where, in response to identifying at least a first location among the virtual interactive environment where a retrieved lux value does not conform with the target lux map, the light rig data is adjusted to change a number of light objects among the light rig.

In some aspects, the techniques described herein relate to a system, wherein a subsequent rendering of the virtual interactive environment is performed for a subsequent sampling of lux values at the at least one region to validate the adjusting of the one or more parameters.

In some aspects, the techniques described herein relate to a computer-implemented method to configure a light rig of a virtual interactive environment including: receiving light rig data of the virtual interactive environment, the light rig data corresponding to a plurality of light objects configured among the virtual interactive environment; receiving a lux map corresponding to a light view rendering of the virtual interactive environment, wherein the light view rendering is based at least in part on the light rig data; sampling lux values from the lux map across one or more regions of the virtual interactive environment; identifying at least one region where the sampled lux map does not conform with a target lux map; determining one or more light objects, among the plurality of light objects of the light rig, providing luminance to the at least one region identified; and adjusting one or more parameters corresponding to the one or more light objects to alter the luminance at the at least one region identified, wherein the adjustment causes luminance at the at least one region of the virtual interactive environment to conform with the target lux map.

In some aspects, the techniques described herein relate to a method, wherein the target lux map includes data corresponding to optimal lux values for the virtual interactive environment.

In some aspects, the techniques described herein relate to a method, wherein the target lux map is based in part on another virtual interactive environment.

In some aspects, the techniques described herein relate to a method, wherein the determination of the one or more light object is based in part on data from the lux map.

In some aspects, the techniques described herein relate to a method, wherein the adjusting of one or more parameters causes the one or more light objects to change at least one parameter corresponding to location, rotation, scale, direction, and luminous intensity.

In some aspects, the techniques described herein relate to a method, where, in response to identifying at least a first location among the virtual interactive environment where a retrieved lux value does not conform with the target lux map, the light rig data is adjusted to change a number of light objects among the light rig.

In some aspects, the techniques described herein relate to a method, wherein a subsequent rendering of the virtual interactive environment is performed for a subsequent sampling of lux values at the at least one region to validate the adjusting of the one or more parameters.

In some aspects, the techniques described herein relate to a non-transitory computer readable medium storing instructions that, when executed by one or more processors, causes to perform a method including: receiving light rig data of a virtual interactive environment, the light rig data corresponding to a plurality of light objects configured among the virtual interactive environment; receiving a lux map corresponding to a light view rendering of the virtual interactive environment, wherein the light view rendering is based at least in part on the light rig data; sampling lux values from the lux map across one or more regions of the virtual interactive environment; identifying at least one region where the sampled lux map does not conform with a target lux map; determining one or more light objects, among the plurality of light objects of the light rig, providing luminance to the at least one region identified; and adjusting one or more parameters corresponding to the one or more light objects to alter the luminance at the at least one region identified, wherein the adjustment causes luminance at the at least one region of the virtual interactive environment to conform with the target lux map.

In some aspects, the techniques described herein relate to a non-transitory computer readable medium, wherein the target lux map includes data corresponding to optimal lux values for the virtual interactive environment.

In some aspects, the techniques described herein relate to a non-transitory computer readable medium, wherein the target lux map is based in part on another virtual interactive environment.

In some aspects, the techniques described herein relate to a non-transitory computer readable medium, wherein the determination of the one or more light object is based in part on data from the lux map.

In some aspects, the techniques described herein relate to a non-transitory computer readable medium, wherein the adjusting of one or more parameters causes the one or more light objects to change at least one parameter corresponding to location, rotation, scale, direction, and luminous intensity.

In some aspects, the techniques described herein relate to a non-transitory computer readable medium, wherein, in response to identifying at least a first location among the virtual interactive environment where a retrieved lux value does not conform with the target lux map, the light rig data is adjusted to change a number of light objects among the light rig.

BRIEF DESCRIPTION OF THE DRAWINGS

This disclosure will be more fully understood from the following detailed description taken in conjunction with the accompanying drawings, in which.

DETAILED DESCRIPTION

Overview

The systems and methods described herein provide for an automated light rigging system for virtual interactive environments, such as those among video games and/or virtual social spaces.

As disclosed herein, an automated light rigging system (hereinafter referred to as "ALRS") is software for creating, placing, and/or configuring one or more light objects or light rigs (e.g., a collection of light objects) among a virtual interactive environment to improve luminance among one or more regions of the virtual interactive environment.

The ALRS can evaluate luminance of light cast or emitted from one or more light rigs and/or light objects among a virtual interactive environment based at least in part on (i) data from one or more light rigs or light objects (hereinafter also referred to as "light rig data") and (ii) a target lux map corresponding to a virtual interactive environment; the target lux map can be used by the ALRS to evaluate luminance associated with one or more light rigs among one or more regions of the virtual interactive environment. The ALRS can evaluate luminance by (i) rendering a light view from the data of the one or more light rigs received, (ii) sampling lux (commonly also referred to as "luminance") values from the rendered light view among one or more regions of the virtual interactive environment, (iii) identifying at least one region where the sampled lux value does not conform to, or correspond with, the target lux values among a target lux map (e.g., at the same or similar region of the virtual interactive environment), and (iv) determining one or more light objects among a light rig that provide and/or contribute luminance to the at least one region identified.

Thereafter, the ALRS can: (i) adjust one or more parameters of a light rig, such as those corresponding to the one or more light objects determined, and/or (ii) produce and/or instantiate a light rig among the virtual interactive environment to cause luminance among the one or more regions identified to conform with, or more closely conform to, target lux values among a target lux map.

In some embodiments, the ALRS includes one or more machine learning models trained on light rig data and/or target lux maps of one or more virtual interactive environments, such that the inference (e.g., runtime execution) of the machine learning model is configured to automate the adjustment and/or generation of light parameters, light objections, and/or lights rigs to optimize the luminance of, to, or among a virtual interactive environment.

Computing Environment

Figure 1:
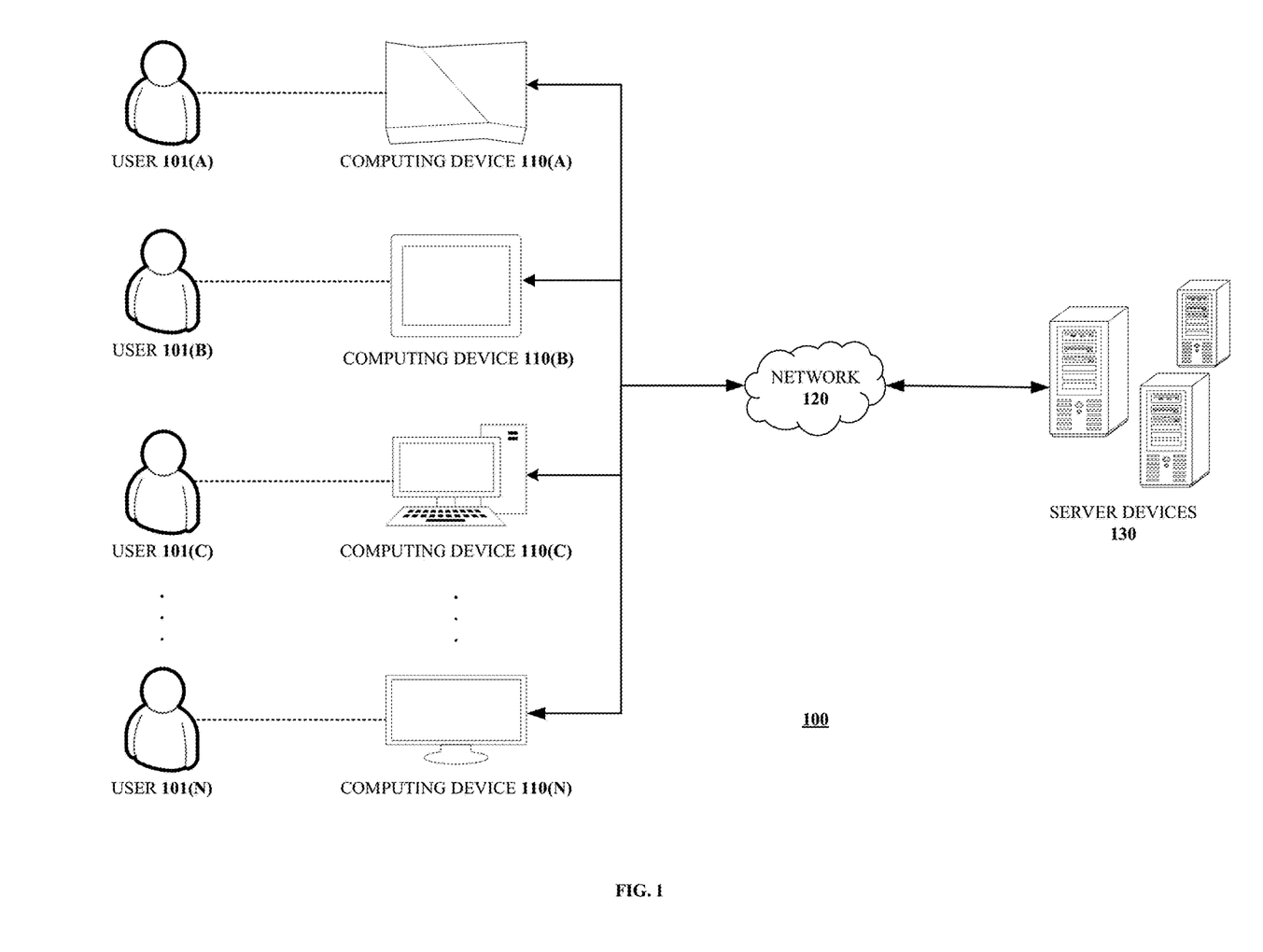
FIG. 1 illustrates a hardware environment, according to an example embodiment.

FIG. 1 illustrates an example embodiment of computing environment 100 to design, develop, test, and/or play a video game—or one or more aspects, features, and/or services thereof—among other things. Computing environment 100 includes communicatively coupled hardware devices. In some embodiments, one or more hardware devices among computing environment 100 include computer executable instructions configured to automate light rig generation, placement, and configuration in virtual interactive environments.

As shown, computing environment 100 including users 105(A), 105(B), 105(C), and 105(N) (collectively referred to herein as "105" or "users 105") and computing devices 110(A), 110(B), 110(C), and 110(D) (collectively referred to herein as "110 or "computing devices 110") that are communicatively coupled to server devices 130 over network 120. In some embodiments, "N" of user 105(N) and computing devices 110(N) is an arbitrary real value that denotes an "A through N" number of users 105 and/or computing devices 110 among computing environment 100.

Users 105 can be players, developers, designers and/or automated agents (hereinafter "agent" in short), among other types. In some embodiments, there is a one-to-one correspondence between the users 105 and the computing devices 110. In some embodiments, there is an N-to-one or one-to-N (wherein "N" is an arbitrary real value) correspondence between the users 105 and the computing devices 110. It should be understood that as described in the present disclosure, a "user" on or of a computing device is synonymous with a "player", "developer", "designer" or an "agent". An agent, as known to a person of ordinary skill in the art, can be configured by way of a machine learning model and/or software to automate one or more tasks; such as, for example, playing or testing a video game.

Computing devices 110 are exemplary hardware devices including computer executable instructions configured for designing, developing, maintaining, monitoring, analyzing, testing, updating, streaming, and/or playing a video game—or one or more aspects, features, and/or services thereof—among other things. As illustrated by way of example in the embodiment of FIG. 1, computing device 110(A) is a video game console; computing device 110(B) is a mobile device; computing device 110(C) is a personal computer; and computing device 110(D) is a display device. In some embodiments, two or more of the computing devices 110 are similar to one another—e.g., of a same type.

In some embodiments, user 105 provides input to computing devices 110 by way of one or more input devices and/or input methods corresponding and/or associated to computing devices 110, as known to a person of ordinary skill in the art. In some embodiments, computing devices 110 can provide output to users 105 by way of one or more output devices and/or output methods corresponding and/or associated to computing devices 110, as known to a person of ordinary skill in the art.

Network 120 communicatively couples computing devices 110 and server devices 130, among other hardware devices. In some embodiments, network 120 includes any method of private and/or public connectivity, networking, and/or communication between or among hardware devices known in the arts. As non-limiting examples, network 120 may include direct wired connections, Near Field Communication (NFC), a Local Area Network (LAN), a Virtual Private Network (VPN), an internet connection, or other communication methods of the like.

Server devices 130 are exemplary hardware devices including computer executable instructions configured to provide services (i.e., remote or cloud services) corresponding to designing, developing, maintaining, monitoring, analyzing, testing, updating, streaming, and/or playing of a video game—or one or more aspects and/or features thereof—among other things to computing devices 110 over network 120. The one or more hardware devices of server devices 130 can be communicatively coupled to one or more computing devices 110 over network 120, among other hardware devices and/or other networking methods.

The exemplary hardware devices of computing devices 110 and server devices 130 include at least one or more processors, graphic processors, memory, and storage, in addition to networking capabilities. In some embodiments, computing devices 110 include computer executable instructions configured to perform one or more functions, tasks, or services of and/or for service devices 130. In some embodiments, server devices 130 include computer executable instructions configured to perform one or more functions, tasks, or services of and/or for computing devices 110.

In some embodiments, computing devices 110 and server devices 130 include computer executable instructions configured to provide and/or enable remote access among hardware devices, such as over network 120. For example, computing device 110(A) may remote access computing device 110(C) and/or one or more hardware devices of server devices 130. In some embodiments, computing devices 110 include computer executable instructions configured to request and/or provide data to server devices 130, such as over network 120. In some embodiments, server devices 130 include computer executable instructions configured to request and/or provide data to computing devices 110, such as over network 120.

In some embodiments, there is an association of a user 105 to one or more user accounts of, or corresponding to, computing devices 110 and/or service devices 130. In some embodiments, there is an association of a user 105 to one or more user accounts corresponding to software and/or video games included, stored, and/or executed among computing devices 110 and/or service devices 130. In some embodiments, user accounts in association with a user 105 are validated by computing devices 110 and/or service devices 130 by one or more methods known to a person of ordinary skill in the art. In some embodiments, agents—as users 105—are deployed, controlled, and/or directed by computing devices 110 and/or service devices 130 by one or more methods known to a person of ordinary skill in the art to perform and/or automate one or more tasks among computing devices 110 and/or service devices 130, among other things.

Figure 2:
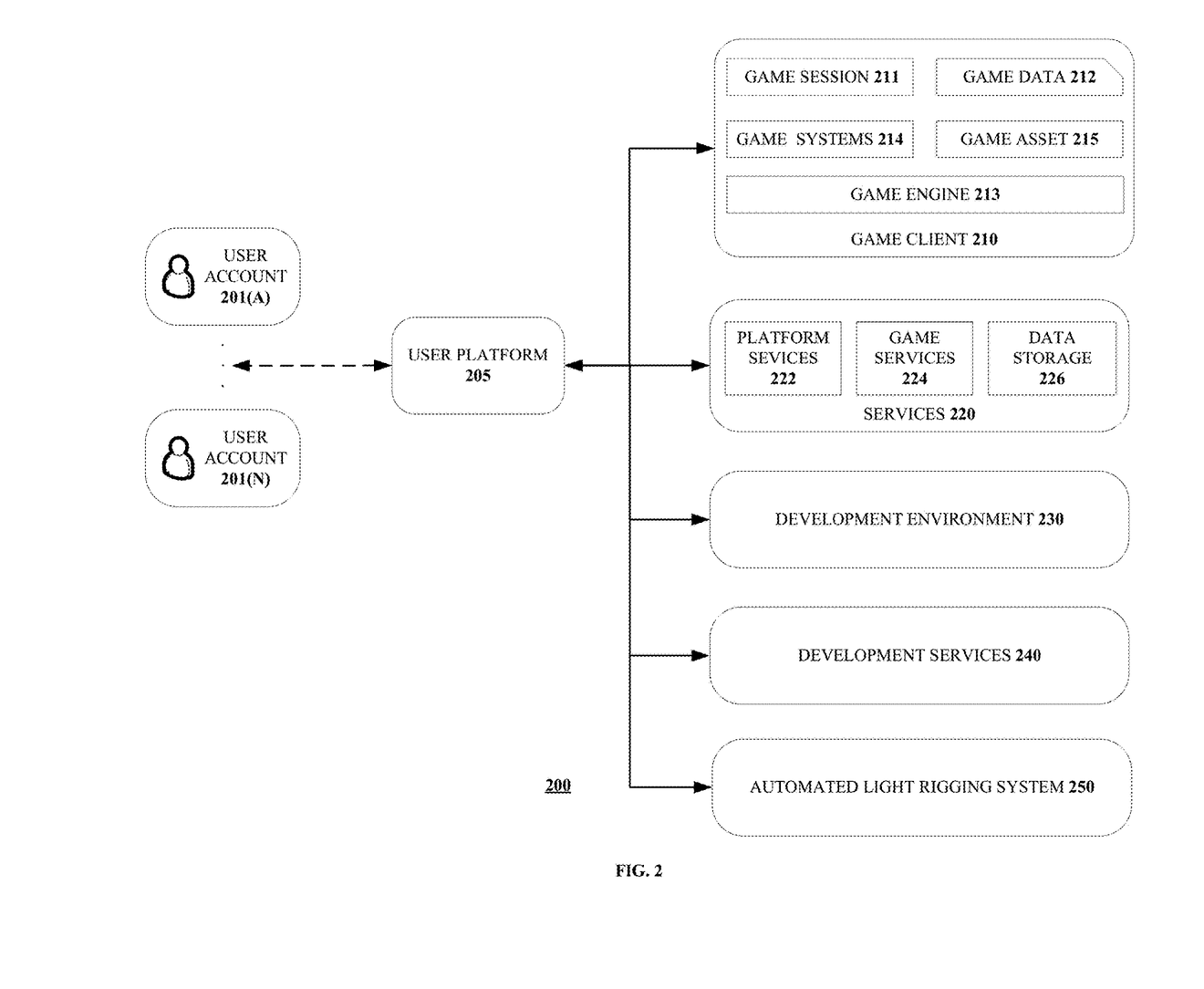
FIG. 2 illustrates a software environment, according to an example embodiment.

FIG. 2 illustrates an example embodiment of a software environment 200 to design, develop, test, and/or play a video game—or one or more aspects, features, and/or services thereof—among other things. Software environment 200 includes a number of software (i.e., computer executable instructions) distributed over—and/or executable on—one or more communicatively coupled hardware devices, similar to computing device 110 and server device 130 over network 120 of FIG. 1. In some embodiments, the software among software environment 200 is used to automate light rig generation, placement, and configuration in virtual interactive environments.

Software environment 200 includes user platform 205, game client 210, service 220, development environment 230, and development service 240. In some embodiments, the software among software environment 200 is configured with computer executable instructions to communicate data.

User platform 205 includes computer executable instructions configured to access and/or manage software and/or services associated with user platform 205, among other things; such as, for example, game clients 210, services 220, development environment 230, and/or development services 240.

In some embodiments, user platform 205 supports and/or requires a "users account" for accessing and/or managing software and/or services associated with user platform 205. As illustrated by way of example in the embodiment of FIG. 2, user account 201(A) through user account 201(N) are accounts of users (similar to users 105 of FIG. 1) that correspond to user platform 205; wherein "N" is arbitrary real value used to denote an "A through N" amount of user accounts (herein collectively referred to as "201"). In some embodiments, each user account 201 may locally execute and/or remotely access or communicate with one or more of the software and/or services among software environment 200 from or on one or more hardware devices.

In some embodiments, user accounts 201 include data provided by users, such as a username, which identifies a user account 201 (and in turn a user) among software environment 200. In some embodiments, data corresponding to and/or communicated among software environment 200 can be associated to and/or with user platform 205 and one or more user accounts 201. In some embodiments, data corresponding to user platform 205—and one or more user accounts 201—is associated to or with game clients 210, services 220, development environment 230, and/or development service 240, among other things.

Game client 210 is software including, comprising, and/or composing of a video game, or portion thereof. Game client 210 includes game client components (213, 214, and 215) and game data 212 that can be utilized to produce and/or maintain game session 211; or multiples thereof.

Game session 211 is an instance of one or more virtual interactive environments of game client 210. In some embodiments, a virtual interactive environment includes one or more virtual levels and/or graphical user interfaces providing an interactive virtual area or virtual space for gameplay and/or socializing. For example, game session 211 can be among a game level or social space, which may include one or more player characters, non-player characters, quests, objectives, and other features, elements, or aspects known in the art. The virtual interactive environment may have a topography and include one or more objects positioned within the topography that are capable of locomotion within the topography. In some instances, the topography may include a two-dimensional topography. In other instances, the topography may include a three-dimensional topography. In some embodiments, game session 211 is produced and/or maintained in part by game data 212, game engine 213, game systems 214, and game assets 215, among other things; such as, for example, user platform 205 and/or services 220.

As a non-limiting example, a first instance of a game session may be of a first version of a first virtual interactive environment, while a subsequent instance of a game session may be of a subsequent version of the first virtual interactive environment, such that there are one or more changes or differences among the first virtual interactive environment between the two instances of the game session.

Game session 211 may include a number of player characters and/or non-player characters. Player characters of game session 211 can refer to controllable character models configured to facilitate or perform gameplay actions or commands. In some embodiments, a user or player can control and/or direct one or more player characters in a virtual interactive environment of game session 211. The term "non-player character" corresponds to character models that are not controlled and/or directed by players (commonly known as "NPCs"). An NPC can be configured with computer executable instructions to perform one or more tasks and/or actions among the gameplay of game session 211 (i.e., gameplay actions); such as with and/or without interaction with or from a player character.

The game session 211 may include a number of player objects. Player objects of game session 211 can refer to controllable objects, or models, used to facilitate or enable gameplay or other in-game actions. Player objects may be, for example, vehicles, vessels, aircraft, ships, tiles, cards, dice, pawns, and other in-game items of the like known to those of skill in the art. In some embodiments, a user or player can control or direct one or more player objects in game session 211, including, in some instances, by controlling player characters which in turn causes the objects to be controlled.

For simplicity, player characters and player objects are collectively referred to herein as player characters in some embodiments. It should be understood that, as used herein, "controllable" refers to the characteristic of being able and/or configured to be controlled and/or directed (e.g., moved, modified, etc.) by a player or user through one or more input means, such as a controller or other input device, by a player or user. As known to a person of ordinary skill in the art, player characters include character models configured to receive input.

Game data 212 is data corresponding to one or more aspects of game client 210, such as gameplay. In some embodiments, game data 212 includes data such as state data, simulation data, rendering data, and other data types of the like.

State data is commonly known as data describing a state of a player character, virtual interactive environment, and/or other virtual objects, actors, or entities—in whole or in part—at one or more instances or periods of time during a game session of a video game. For example, state data can include the current location and condition of one or more player characters among a virtual interactive environment at a given time, frame, or duration of time or number of frames.

Simulation data is commonly known as the underlying data corresponding to simulation (i.e., physics and other corresponding mechanics) to drive the simulation of a model or object in a game engine. For example, simulation data can include the joint and structural configuration of a character model and corresponding physical forces or characteristics applied to it at instance or period of time during gameplay, such as a "frame", to create animations, among other things.

Render Data is commonly known as the underlying data corresponding to rendering (e.g., visual, and auditory rendering) aspects of a game session, which are rendered (e.g., for output to an output device) by a game engine. For example, render data can include data corresponding to the rendering of graphical, visual, auditory, and/or haptic output of a video game, among other things. During rendering, the luminance can be computed. The rendering process can be performed by various hardware and software components. For example, luminance can be computed on a CPU (single or multiple threads), using graphics hardware via interfaces such as OpenGL or DirectX, or using the GPGU approach like CUDA or JAX. In some embodiments, cloud computing can be utilized for parallelization.

In some embodiments, gameplay session 211 is based in part on game data 212. During game session 211 (e.g., runtime execution), one or more aspects of gameplay (e.g. rendering, simulation, state, gameplay actions of player characters) uses, produces, generates, and/or modifies game data 212 or portion thereof. Likewise, gameplay events, objectives, triggers, and other aspects, objects, or elements of the like also use, produce, generate, and/or modify game data 212, or a portion thereof. In some embodiments, game data 212 includes data produced or generated over the course of a number of game sessions associated with one or more game clients 210. Game data 212 may be updated, versioned, and/or stored periodically as a number of files to a memory device associated with game client 210, or remotely on a memory device associated with a game server or game service, such as data storage 226. Additionally, game data 212, or copies and/or portions thereof, can be stored, referenced, categorized, or placed into a number of buffers or storage buffers. A buffer can be configured to capture particular data, or data types, of game data 212 for processing and/or storage. These buffers can be used by game client 210, service 220, user platform 205, development environment 230, and/or development services 240 for performing one or more tasks.

For simplicity, the terms "data", "game data", "game data", "state data", "simulation data", and "render data" can be used interchangeably to refer to the data of, or corresponding to, a video game.

Game client components (e.g., game engine 213, game systems 214, and game assets 215) are portions or subparts of game client 210 that provide the underlying frameworks and software that support and facilitate features corresponding to gameplay, such as instancing game sessions that connect one or more user accounts for gameplay among a virtual interactive environment.

Game engine 213 is a software framework configured with computer executable instructions to execute computer executable instructions corresponding to a video game (e.g., game code). In some embodiments, game engine 213 is a distributable computer executable runtime portion of development environment 230. In some embodiments, game engine 213 and development environment 230 are game code agnostic.

In some embodiments, game engine 213 includes, among other things, a renderer, simulator, and stream layer. In some embodiments, game engine 213 uses game data (e.g., state data, render data, simulation data, audio data, and other data types of the like) to generate and/or render one or more outputs (e.g., visual output, audio output, and haptic output) for one or more hardware devices.

As used herein in some embodiments, a renderer is a graphics framework that manages the production of graphics corresponding to lighting, shadows, textures, user interfaces, and other effects or game assets of the like. As used herein in some embodiments, a simulator refers to a framework that manages simulation aspects corresponding to physics and other corresponding mechanics used in part for animations and/or interactions of gameplay objects, entities, characters, lighting, gasses, and other game assets or effects of the like.

As used herein in some embodiments, a stream layer is a software layer that allows a renderer and simulator to execute independently of one another by providing a common execution stream for renderings and simulations to be produced and/or synchronized (i.e., scheduled) at and/or during runtime. For example, a renderer and simulator of game engine 213 may execute at different rates (e.g., ticks, clocks) and have their respective outputs synchronized accordingly by a stream layer.

As used herein in some embodiments, game engine 213 also includes an audio engine or audio renderer that produces and synchronizes audio playback with or among the common execution of a stream layer. In some embodiments, an audio engine of game engine 213 can use game data to produce audio output and/or haptic output from game data. In some embodiments, an audio engine of game engine 213 can transcribe audio data or text data to produce audio haptic output.

Game systems 214 includes software configured with computer executable instructions that provide, facilitate, and manage gameplay features and gameplay aspects of game client 210. In some embodiments, game systems 214 includes the underlying framework and logic corresponding to gameplay of game client 210. For simplicity, game systems 214 are the "game code" that compose a video game of game client 210. As such, game systems 214 are used in part to produce, generate, and maintain gameplay among an instance of a virtual interactive environment, such as the gameplay among game session 211.

As used herein in some embodiments, game engine 213 and/or game systems 214 can also use and/or include Software Development Kits (SDKs), Application Program Interfaces (APIs), Dynamically Linked Libraries (DLLs), and other software libraries, components, modules, shims, or plugins that provide and/or enable a variety of functionality to game client 210; such as—but not limited to—graphics, audio, font, or communication support, establishing and maintaining service connections, performing authorizations, and providing anti-cheat and anti-fraud monitoring and detection, among other things.

Game assets 215 are digital assets that correspond to game client 210. In some embodiments, the game assets 215 can include virtual objects, character models, actors, entities, geometric meshes, textures, terrain maps, animation files, audio files, digital media files, font libraries, visual effects, and other digital assets commonly used in video games of the like. As such, game assets 215 are the data files used in part to produce the runtime of game client 210, such as the virtual interactive environments and menus. In some embodiments, game engine 213 and/or game systems 214 reference game assets 215 to produce game session 211.

In some embodiments, game client 210 can be played and/or executed on one or more hardware devices, such as computing devices 110 and server devices 130 of FIG. 1. In some embodiments, there are a number of game clients 210 that may include variations among one another: such as including different software instructions, components, graphical configurations, and/or data for supporting runtime execution among different hardware devices.

For example, multiple game clients 210 can be of the same video game wherein one game client 210 includes variations for support on a video game console (such as computing device 110(A) in FIG. 1), while another game client 210 includes variations for support on a mobile device (such as computing device 110(B) in FIG. 1). However, since the game clients are of the same video game, both game clients can connect to the same instance of a game session (such as game session 211) to enable user accounts 201 of user platform 205 to interact with one another by being communicatively coupled; such as by hardware devices running and/or accessing a game client 210 in communication with services 220.

Service 220 are software services including computer executable instructions configured to provide a number of services to user platform 205 and/or game client 210. As illustrated by way of example in FIG. 2, services 220 includes, but is not limited to, platform services 222, gameplay services 224, and data storage 226. In some embodiments, services 222 includes computer executable instructions configured and/or provided by development environment 230 and/or development services 240.

Platform services 222 includes computer executable instructions configured to provide anti-fraud detection, software management, user account validation, issue reporting, and other services corresponding to user platform 205 of the like.

Gameplay services 224 includes computer executable instructions configured to provide matchmaking services, game state management, anti-fraud detection, economy management, player account validation, and other services corresponding to gameplay of the like to game clients 210.

In some embodiments, platform services 222 and/or gameplay services 224 establish and maintain connections that, at least in part, facilitate gameplay in a game session of game client 210, such that game session 211 of game client 210 connects one or more users accounts 201 of user platform 205 for multiplayer gameplay and/or multi-user interaction among an instance of a virtual interactive environment.

Data storage 226 provides data storage management services to the software among software environment 200. In some embodiments, data communicated by and/or corresponding to elements 205, 201, 210, 220, 230, 240 and 250 may be stored, versioned, and/or managed—as one or more files—to and/or by data storage 226 or one or more hardware devices corresponding to software environment 200.

In some embodiments, Game clients 210 and user platform 205 can communicate with service 220 over a network, such as network 120 illustrated in FIG. 1. In some embodiments, service 220 is provided by server devices 130 of FIG. 1. In some embodiments, game client 210 and/or user platform 205 can require a user account 201 to access one or more features of game client 210; such as social gaming features including multiplayer game sessions or player to player communications. Respectively, data, such as game data 212 corresponding to one or more game sessions of game client 210 can be associated to user accounts 201 in some embodiments.

Development Environment 230 is software enabling the development or maintenance of one or more aspects, features, tools, and/or services corresponding to one or more of the software among software environment 200. In some embodiments, development environment 230 is a collection of tools, frameworks, services, and other computer executable instructions and applications of the like, such as, for example, a video game development engine. In some embodiments, development environment 230 can utilize external software—such as components, modules, libraries, plugins, and other systems of the like—to extend or expand functionality and/or capabilities.

Development Services 240 are software services including computer executable instructions configured to provide services corresponding to user platform 205, game client 210, services 220 and/or development environment 230. In some embodiments, development services 240 provide services similar to functionality and capabilities of development environment 230, thereby allowing and/or enabling development for software corresponding to, and/or aspects of, software environment 200. In some embodiments, development services 240 provide services to mock and/or simulate one or more components, services, or aspects of user platform 205, game client 210, and/or services 220, thereby allowing and/or enabling testing and/or validation, among other things, for one or more aspects corresponding to software environment 200.

ALRS 250 is software including computer executable instructions configured to automate light rig creation and configuration in virtual interactive environments, such as for optimizing luminance of a video game. In some embodiments, ALRS 250 is based at least in part on training data from game client 210, such as data corresponding to light rigs, lux values, lux maps, and virtual interactive environments, among other things. In some embodiments, ALRS 250 can utilize and/or leverage development environment 230, game client 210, and data storage 226 for configuration, training, and/or inference of one or more machine learning models, such as evolution strategies (ES) or other gradient-based optimization techniques (e.g., stochastic gradient descent, momentum methods, Adam optimizer, etc.), for configuring and/or producing light rigs.

As known to a person of ordinary skill in the art, a light rig is a collection and/or configuration of one or more (virtual) light objects, such as those among a virtual interactive environment. In some embodiments, each light object among the light rig includes configurable parameters that can be adjusted to change a number of properties of each light object—individually or collectively—such as size, rotation, scale, position, offset, luminance, radiance, direction, frequency, color, and other properties of the like. In some embodiments, a light rig is also an object, class of objects, or other container of the like that is usable and configurable among a virtual interactive environment.

Light rig data, as used herein, refers to data corresponding to one or more light rigs. As such, each light rig can have its own corresponding light rig data. Alternatively, light rig data can also correspond to a collection of the data from two or more light rigs among one or more virtual interactive environments.

In some embodiments, software among or corresponding to software environment 200—and the corresponding systems and methods thereof—utilize machine learning. Machine learning is a subfield of artificial intelligence, which, to persons of ordinary skill of the art, corresponds to underlying algorithms and/or frameworks (commonly known as "neural networks" or "machine learning models") that are configured and/or trained to perform and/or automate one or more tasks or computing processes. For simplicity, the terms "neural networks" and "machine learning models" can be used interchangeably and can be referred to as either "networks" or "models" in short.

In some embodiments, software among or corresponding to software environment 200—and the corresponding systems and methods thereof—utilize deep learning. Deep learning is a subfield of artificial intelligence and machine learning, which, to persons of ordinary skill of the art, corresponds to multilayered implementations of machine learning (commonly known as "deep neural networks"). For simplicity, the terms "machine learning" and "deep learning" can be used interchangeably.

As known to a person of ordinary skill in the art, machine learning is commonly utilized for performing and/or automating one or more tasks such as identification, classification, determination, adaptation, grouping, and generation, among other things. Common types (i.e., classes or techniques) of machine learning include supervised, unsupervised, regression, classification, reinforcement, and clustering, among others.

Among these machine learning types are a number of model implementations, such as linear regression, logistic regression, evolution strategies (ES) or other gradient-based optimization techniques (e.g., stochastic gradient descent, momentum methods, Adam optimizer, etc.), convolutional neural networks (CNN), deconvolutional neural networks (DNN), generative adversarial networks (GAN), recurrent neural networks (RNN), and random forest, among others. As known to a person of ordinary skill in the art, one or more machine learning models can be configured and trained for performing one or more tasks at runtime of the model.

As known to a person of ordinary skill in the art, the output of a machine learning model is based at least in part on its configuration and training data. The data that models are trained on (e.g., training data) can include one or more data types. In some embodiments, the training data of a model can be changed, updated, and/or supplemented throughout training and/or inference (i.e., runtime) of the model. In some embodiments, training data corresponds to one or more data types corresponding to software among software environment 200.

A "machine learning module" is a software module and/or hardware module including computer-executable instructions to configure, train, and/or deploy (i.e., execute) one or more machine learning models. In some embodiments, software corresponding to software environment 200 includes one or more machine learning modules.

Automated Light Rigging System

Figure 3A:
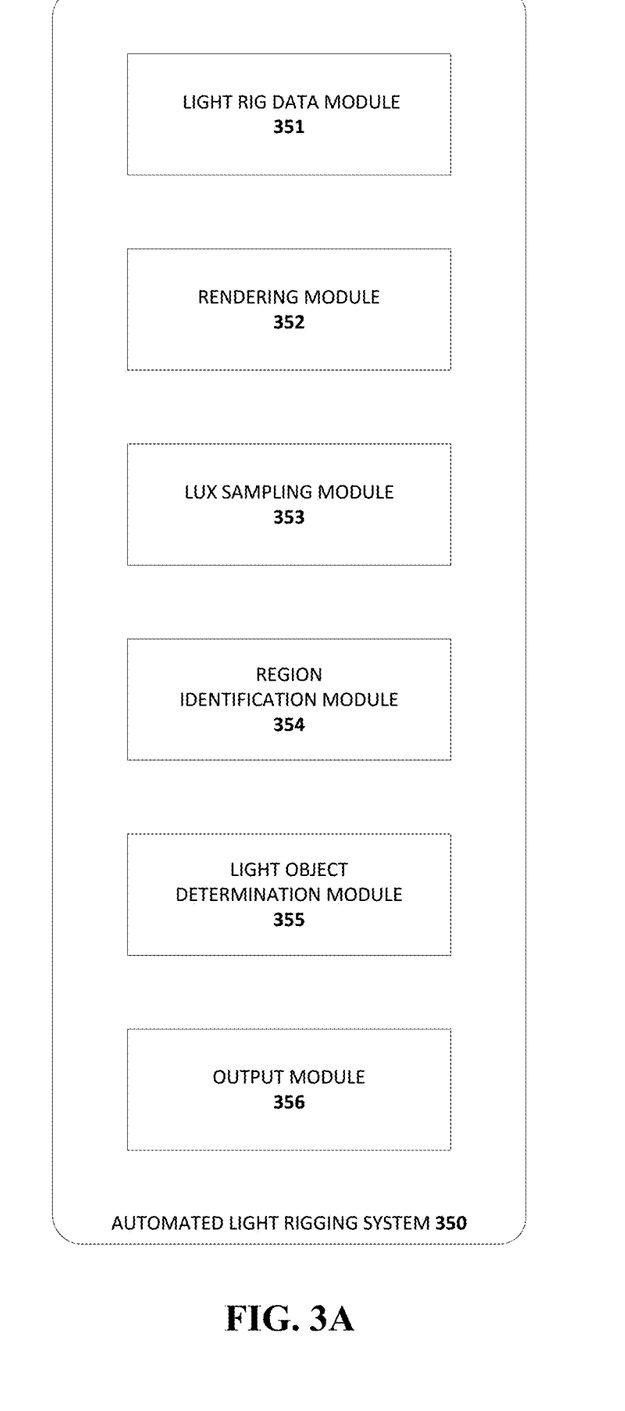
FIG. 3A illustrates an example embodiment of an automated light rigging system.

FIG. 3A illustrates an example embodiment of an automated light rigging system (ALRS) 250. ALRS 250 includes one or more software modules configured to perform one or more tasks. In some embodiments, ALRS 250 includes one or more machine learning modules and/or one or more machine learning models. In some embodiments gradient-based optimization models can be used. For example, in one embodiment, an ES model can be used.

As known to a person of ordinary skill in the art, there are a number of ways to configure an ES model, such as, for example, by way of the parameters or hyperparameters (e.g., layers, filtering, pooling, striding, and other model aspects of the like).

In some embodiments, ALRS 250 includes a unique ES approach to automate the adjustment and/or creation of light rigs for a virtual interactive environment, such as those among game client 210 of FIG. 2. The ES of ALRS 250 can be configured to include optimization constraints that optimize the application of light rigs among virtual interactive environments.

In some embodiments, the criteria to which the optimization constraints are based in part on are a loss function that, in whole or in part, define one or more penalties for deviating from a target lux or target luminance at one or more regions, sections, or portions of a virtual interactive environment. In some embodiments, a target lux or target luminance can be defined among a target lux map (e.g., a luminance map with ideal or target luminance values that correspond to one or more virtual interactive environments, or one or more regions thereof).

In some embodiments, the loss function of the ES of ALRS 250 includes a computation of a target luminance loss and of a uniformity loss. In some embodiments, the loss function the ES of ALRS 250 is a summation of deviations from one or more regions among a virtual interactive environment.

For example, the loss function may be defined as:

$$L(\chi) = R1(\chi) + R2(\chi) + R3(\chi); \text{ where,}$$

$$RN(\chi) = \int \int RN|\text{Target Lux} - \text{Sampled Lux}(\chi, x, y)|dx\, dz$$

In some embodiments, the optimization constraints include, but are not limited to: (i) a maximum number of light objects for one or more light rig objects, (ii) an approximate location of the light objects among a light rig, and (iii) a number of principal lights and their corresponding parameters, among other constraints of the like. In some embodiments, one or more of the optimization constraints is based at least in part on one or more aspects of the virtual interactive environment, such as layout and size. In some embodiments, one or more of the optimization constraints is defined explicitly and/or implicitly (e.g., deduced from light rig data).

In some embodiments, the optimization constraints may be configured to limit the number of lights with non-zero contribution at particular locations or all locations in the environment. The number of lights may be limited for run-time efficiency considerations. The ALRS can evaluate the constraint to determine how to limit the lights. For example, a rig may have sixteen lights but each spot in the environment (such as, for example, a location on a soccer pitch) should receive light from only eight of them. The luminance can be computed for each light, and some of the less significant lights can be dropped for the sake of faster computations.

In some embodiments, the constraints can be configured to provide a directional distribution of lights on an object within the environment. The directional distribution of lights should provide a non-flat appearance to the object in the environment. For example, an athlete on the stadium pitch within the environment needs to have lighting that leaves some sides less illuminated to emphasize its 3D look as compared to a flat look when the athlete is illuminated equally from all sides with the same intensity.

Light rig data module 251 is configured to receive, request, or access data corresponding to one or more light rigs (e.g., light rig data) in or among a virtual interactive environment. The light rig data received, requested, or accessed by Light rig data module 251 can be stored among a local or remote datastore, such as to data storage 226 of FIG. 2.

In some embodiments, light rig data can be captured, stored, read, and used in a number of formats; including plain text format such as comma separated value (CSV). In some embodiments, the light rig data is associated with or corresponds to one or more virtual interactive environments and/or one or more light objects. In some embodiments, ALRS 250 can receive light rig data without the execution of a respective game client (e.g., video game software application), thereby allowing light rig data and/or light rig objects to be adjusted "offline" (e.g., outside of the runtime of a game client) and/or during development.

During training of the ES of ALRS 250, light rig data module 251 can be configured to receive, request, or access light rig data from a number of virtual interactive environments. The light rig data received during the training, or among a training session, of the ES of ALRS 250 can be labeled and/or treated as "training data". In some embodiments, the ES model of ALRS 250 can utilize training data for optimization, such as by updating the gradient and other corresponding parameters of the ES model.

At inference of the ES of ALRS 250, Light rig data module 251 can be configured to receive, request, or access data corresponding to one or more light rigs from one or more virtual interactive environments. The light rig data received during inference, or runtime, of ALRS 250 can be labeled and/or treated as "input data". The input data is then utilized by other modules and components among ALRS 250. In some embodiments, the ES model of ALRS 250 can also utilize input data to optimize the ES model, such as by updating the gradient and other corresponding parameters.

Rendering module 252 is configured to receive, request, and/or acquire render data corresponding to one or more viewpoints of one or more virtual interactive environments associated with the light rig data received by Light rig data module 251.

In some embodiments, the render data received by rendering module 252 is a lux map that corresponds to the luminance among one or more regions of a virtual interactive environment, among other things. In some embodiments, the lux map received by the rendering module corresponds to the luminance among one or more regions of a virtual interactive environment provided by, or caused by, one or more light objects corresponding to the light rig data, among other things.

In some embodiments, rendering module 252 can provide one or more computer executable instructions to development environment 230 to execute game client 210, or a portion thereof corresponding to one or more virtual interactive environments associated with the light rig data received by light rig data module 251. As a result, development environment 230 can render one or more viewpoints of the one or more virtual interactive environments associated with the light rig data received by light rig data module 251. Thereafter, ALRS 250 can receive, request, and/or acquire data, such as render data and/or light data, from the one or more renderings.

In some embodiments, rendering module 252 can provide one or more computer executable instructions to game client 210 to execute one or more virtual interactive environments that correspond to the light rig data received by Light rig data module 251. As a result, game client 210 can provide one or more renderings among its runtime corresponding to one or more viewpoints of the one or more virtual interactive environments associated with the light rig data received by Light rig data module 251. Thereafter, ALRS 250 can receive, request, and/or acquire data, such as render data and/or light data, from the one or more renderings.

In some embodiments, rendering module 252 can receive, request, and/or acquire data—such as render data and/or light data archived among a datastore—that corresponds to one or more viewpoints of the one or more virtual interactive environments associated with the light rig data received by Light rig data module 251. Render module 252 can use this data to render, produce, interpret, or create—such as by, but not limited to, differential rendering—a light view corresponding to luminance among a virtual interactive environment.

In some embodiments, a light view is a luminance map (e.g., a lux map) that illustrates or indicates the luminance among a virtual interactive environment or portion thereof.

Lux sampling module 253 is configured to sample lux values from the render data received, or the light view produced, by rendering module 252. In some embodiments, render data includes lux maps, such as those in the format of a plain text file or CSV. As such, lux sampling module 252 can be configured to ingest a lux map for sampling or determining the luminance at one or more regions of a virtual interactive environment.

The amount of regions sampled among a lux map (e.g., regions of a virtual interactive environment) can be configured based on a number of factors; including, but not limited to, lighting design goals and/or lighting computational requirements for the game client, and/or efficiency of the ES model, among other things. In some embodiments, the amount of regions sampled corresponds to the configuration of the loss function of the ES model of ALRS 250.

Region identification module 254 is configured to identify regions among the rendered virtual interactive environment that do not conform to a target lux map, based at least in part on the lux sampling of lux sampling module 253. In some embodiments, the region identification module 254 is the loss function portion of the ES model of ALRS 250. In some embodiments, the regions, or corresponding regions, can be defined explicitly by a loss function. In some embodiments, the regions, or corresponding regions, can be defined among the target lux map, the sampled lux map, and/or other data corresponding to virtual interactive environments associated with the target lux map and/or sampled lux map.

In some embodiments, the region identification model compares the difference between values of corresponding regions between a target lux map and the sampled lux map, hereinafter known as a lux difference. In turn, the loss function is equivalent to the summation of the lux difference across each of the corresponding regions.

In some embodiments, the lux difference for each region is subject to one or more thresholds. A lux threshold can be defined as a discrepancy range or deviation range for a permissible lux difference. In some embodiments, each region among the loss function can have a unique lux threshold, based in part one or more factors, such as the overall visible or computational impact during rendering of that region with respect to one or more viewpoints (e.g., camera views). In some embodiments, wherein the result of the loss function is within each lux threshold, the ALRS 250 can mark the light rig data as valid or acceptable and proceed to assess the next light rig data input. In some embodiments, a sampled lux map must match a target lux map to be sufficiently valid or acceptable, such that no lux threshold is utilized among the loss function.

In some embodiments, a target lux map and sampled lux map correspond to the same virtual interactive environment, such that corresponding regions between the target lux map and the sampled lux map are the same or similarly defined regions which correspond to the same, or similar area, of the virtual interactive environment.

In some embodiments, corresponding regions between a target lux map and the sampled lux map are regions among different virtual interactive environments that are similar to one another. As in such embodiments, the target lux map can be based in part on a virtual interactive environment that is similar to the virtual interactive environment corresponding to the render data that is sampled by lux sampling module 253. As a result, a target lux map may be sourced from a game client that differs but is similar to the game client used to render the render data acquired by rendering module 252.

Light object determination module 255 is configured to determine which light objects contribute luminance to the regions identified by region identification module 254. The light object determination module can utilize data from the lux map to identify or determine (through mathematical calculation based in part one or more parameters of each light object) which light object(s) among the light rig—corresponding the light rig data associated with the lux map—project a luminance to a respective or corresponding region, as described for 254.

Output module 256 is configured to cause a change in one or more parameters of the one or more light objects identified by light object module 255 to cause subsequent rendering of the virtual interactive environment to conform, or more closely conform with, a target lux map. The output module can change the parameters by (i) adjusting the values within the current light rig data (e.g., editing or writing) assessed by ALRS 250, or (ii) producing a new light rig data for use by a game client. In some embodiments, the output from output module 256 causes or invokes a subsequent rendering of a virtual interactive environment with the output light rig data among game client 210 or development environment 230.

The software modules illustrated in FIG. 3A are provided by way of example, not limitation, to illustrate one embodiment of steps that correspond to the functionality of ALRS 250.

Automated Light Rigging System (ALRS) Process

Figure 3B:
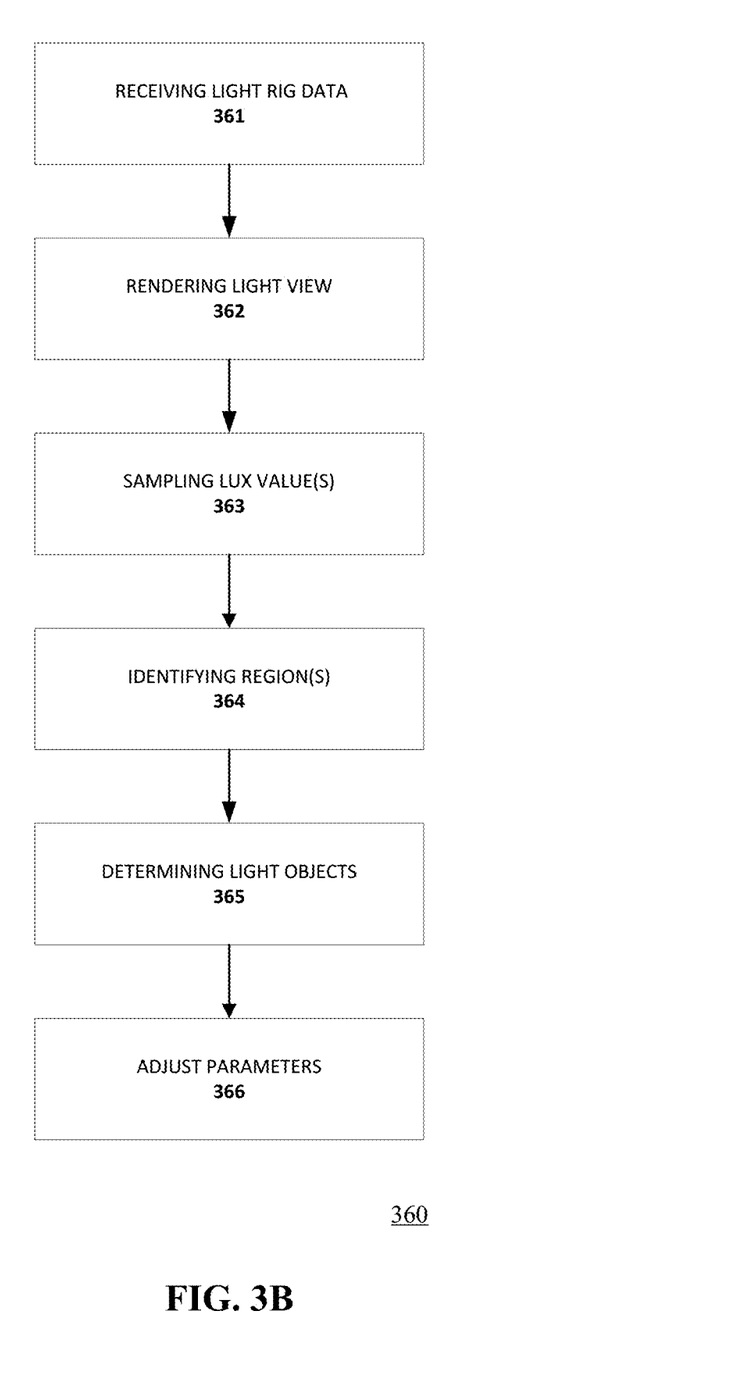
FIG. 3B illustrates an example embodiment of a process of an automated light rigging system.

FIG. 3B illustrates an example embodiment of a process associated with an ALRS. In some embodiments, process 360 represents the steps occurring during the inference of an ALRS: similar to the ALRS illustrated in and described herein with reference to in FIG. 2 and FIG. 3A.

At step 361, the ALRS receives light rig data that corresponds to one or more light objects providing luminance in one or more virtual interactive environments of a game client. In some embodiments, step 361 is performed by a light rig data module, similar to light rig data module 251 of FIG. 3A.

At step 362, the ALRS receives a lux map corresponding to a light view rendering of the virtual interactive environment. In some embodiments, the light view rendering is based at least in part on the light rig data used among the virtual interactive environment rendered. In some embodiments, step 362 is performed by a rendering module, similar to rendering module 252 in FIG. 3A.

At step 363, the ALRS samples lux values from the lux map across one or more regions of the virtual interactive environment. In some embodiments, step 363 is performed by a lux sampling module, similar to lux sampling module 253 in FIG. 3A.

At step 364, the ALRS identifies at least one region where the sampled lux map does not conform with a target lux map. In some embodiments, a target lux map includes data corresponding to optimal lux values for a virtual interactive environment. In some embodiments, step 364 is performed by a region identification module, similar to region identification module 254 in FIG. 3A.

At step 365, the ALRS determines one or more light objects among the light rig—corresponding to the light rig data received at step 361—providing luminance to at least one region identified in step 364. In some embodiments, the determination of one or more light objects in step 365 is based at least in part on data from the lux map of step 363. In some embodiments, step 365 is performed by a light object determination module, similar to light object determination module 255 in FIG. 3A.

At step 366, the ALRS adjusts, among the light rig data, one or more parameters corresponding to the one or more light objects of step 365 to alter the luminance at the at least one region identified in step 364. In some embodiments, the adjusting of one or more parameters causes the one or more light objects to change at least one parameter corresponding to location, rotation, scale, direction, and luminous intensity. In some embodiments, the ALRS can adjust the light rig data to change the number of light objects among a corresponding light rig associated with the light rig data.

In some embodiments, the adjustment of step 366 causes a lux value of at least one region to conform with the target lux map in a subsequent rendering of the virtual interactive environment. In some embodiments, the subsequent rending is utilized to perform a subsequent lux sampling, as in step 363, to validate the adjustment of step 366. In some embodiments, step 366 is performed by an output module, similar to output module 256 in FIG. 3A.

The steps illustrated in process 360 are provided by way of example, and not limitation, and can be implemented in a number of ways by one skilled in the art. As such, the steps of process 360 can occur in different orders and/or simultaneously with one another. In some embodiments, the steps illustrated in process 360 are performed by one or more software modules. In some embodiments, process 360 reiterates from the beginning after the final step is completed.

In some embodiments, one or more steps, or portions thereof, among process 360 are performed by one or more machine learning models and/or machine learning modules. For example, the ALRS can utilize one or more machine learning models, such as ES models or other gradient-based optimization models. In some embodiments, one or more steps, or portions thereof, among process 360 are performed by an ES trained on light rig data to adjust or produce light rigs for a virtual interactive environment. In some embodiments, cloud computing can be utilized for parallelization and can run several randomized instances of ALRS, and the instance with the best output can be selected.

Light Configuration Example

Figure 4:
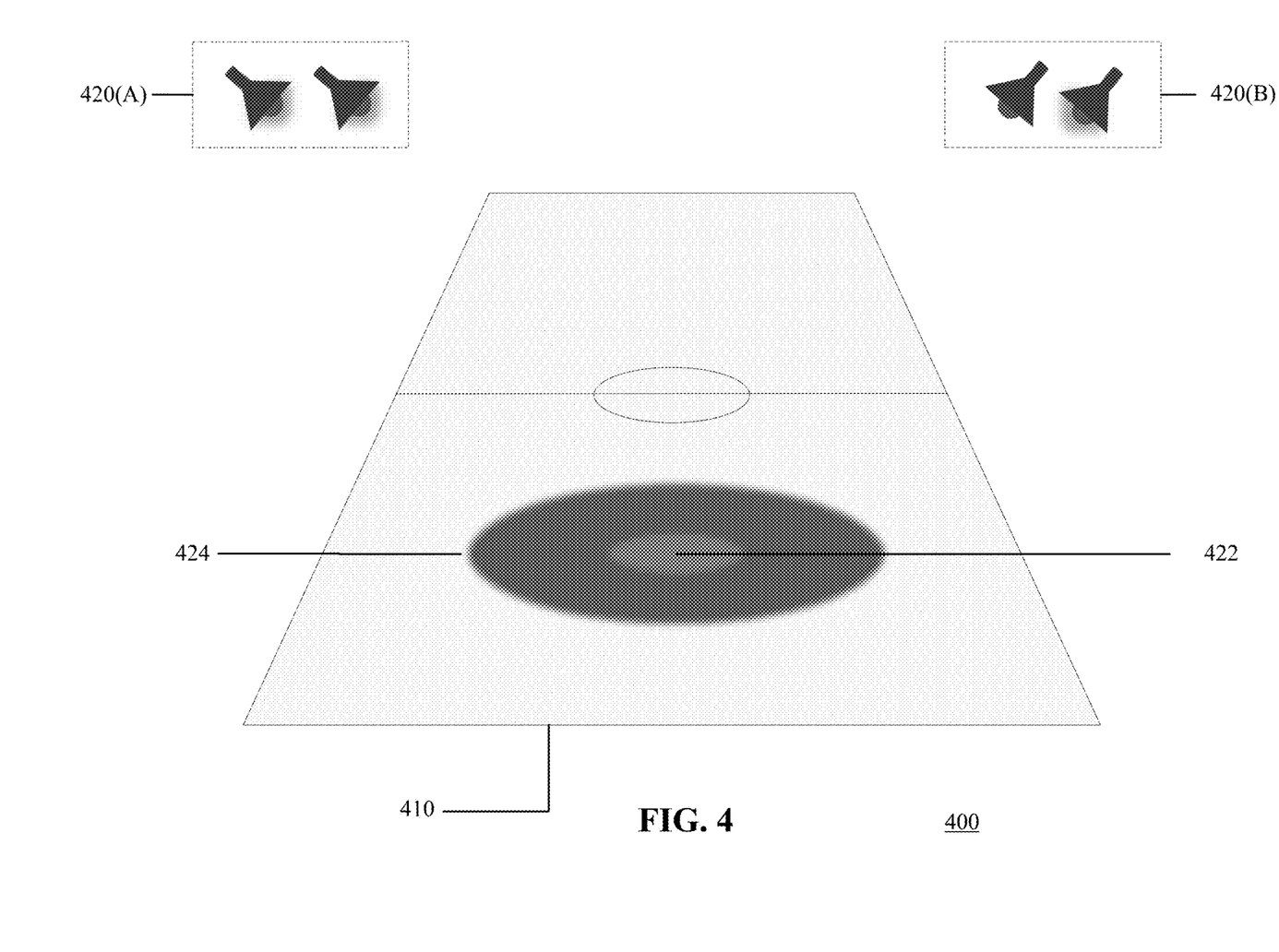
FIG. 4 illustrates an example configuration of a light rig in a virtual interactive environment, according to an example embodiment.

FIG. 4 illustrates an example of a light rig configuration among virtual interactive environment 400. In some embodiments, the virtual interactive environment 400 corresponds to a game session of a game client similar to game session 211 of game client 210 of FIG. 2. In some embodiments, the configuration of a light rig among virtual interactive environment 400 is performed by an ALRS; similar to ALRS 250 of FIG. 3A and process 360 of FIG. 3B.

Virtual interactive environment 400 includes playing field 410 that is illuminated by light rigs 420(a) and 420(b) (collectively referred to as "light rig 420").

As an illustrative example, light rig 420 includes a number of light objects that narrowly luminate a region of playing field 410: the narrow luminance illustrated as luminance 422. Luminance 422 may fail to properly luminate a region of playing field 410. As such, an ALRS can sample and/or evaluate luminance 422 and compare it against a target lux map corresponding to a desired luminance for the regions of playing field 410.

Thereafter, the ALRS can reconfigure one or more properties of light rig 420, and/or produce additional light objects and/or light rigs to include among light rig 420 to enable the luminance of light rig 420 to conform, or to more closely conform, with the luminance of the target lux map. As a result, light rig 420 and produce luminance 424: which properly luminates a region of playing field 410.

Computing Device

Figure 5:
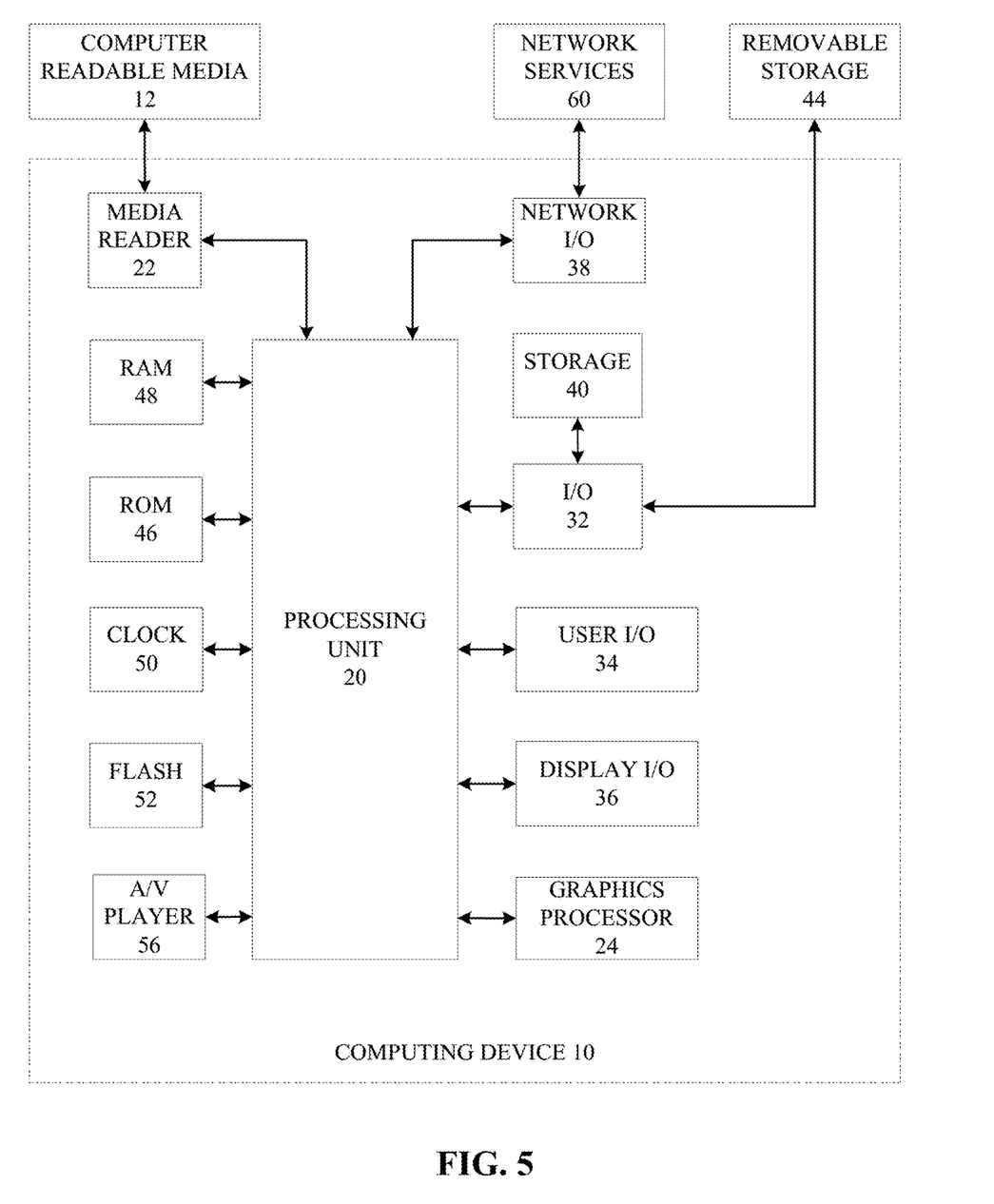
FIG. 5 illustrates an example embodiment of a computing device.

FIG. 5 illustrates an example embodiment of the resources within a computing device 10. In some embodiments, some or all of the aforementioned hardware devices—such as computing devices 110 and server devices 130 of FIG. 1—are similar to computing device 10, as known to those of skill in the art.

Other variations of the computing device 10 may be substituted for the examples explicitly presented herein, such as removing or adding components to the computing device 10. The computing device 10 may include a video game console, a smart phone, a tablet, a personal computer, a laptop, a smart television, a server, and the like.

As shown, the computing device 10 includes a processing unit 20 that interacts with other components of the computing device 10 and external components. A media reader 22 is included that communicates with computer readable media 12. The media reader 22 may be an optical disc reader capable of reading optical discs, such as DVDs or BDs, or any other type of reader that can receive and read data from computer readable media 12. One or more of the computing devices may be used to implement one or more of the systems disclosed herein.

Computing device 10 may include a graphics processor 24. In some embodiments, the graphics processor 24 is integrated into the processing unit 20, such that the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a video game console device, a general-purpose laptop or desktop computer, a smart phone, a tablet, a server, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data. In addition to storage 40 and removable storage media 44, computing device 10 is also shown including ROM (Read-Only Memory) 46 and RAM 48. RAM 48 may be used for data that is accessed frequently during execution of software.

User I/O 34 is used to send and receive commands between processing unit 20 and user devices, such as keyboards or game controllers. In some embodiments, the user I/O can include a touchscreen. The touchscreen can be a capacitive touchscreen, a resistive touchscreen, or other type of touchscreen technology that is configured to receive user input through tactile inputs from the user. Display I/O 36 provides input/output functions that are used to display images. Network I/O 38 is used for input/output functions for a network. Network I/O 38 may be used during execution, such as when a client is connecting to a server over a network.

Display output signals produced by display I/O 36 comprising signals for displaying visual content produced by computing device 10 on a display device, such as graphics, GUIs, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such as display 16.

The computing device 10 can also include other features, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48, or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and other storage) is usable to store variables and other processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

Some portions of the detailed descriptions above are presented in terms of symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The disclosed subject matter also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including optical disks, CD-ROMs, and magneto-optical disks, read-only memories (ROMs), random access memories (RAMs), EPROMs, EEPROMs, magnetic or optical cards, or any type of media suitable for storing electronic instructions, each coupled to a computer system bus.

The disclosed subject matter may be provided as a computer program product, or software, that may include a machine-readable medium having stored thereon instructions, which may be used to program a computer system (or other electronic devices) to perform a process according to the disclosed subject matter. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Certain example embodiments are described above to provide an overall understanding of the principles of the structure, function, manufacture and use of the devices, systems, and methods described herein. One or more examples of these embodiments are illustrated in the accompanying drawings. Those skilled in the art will understand that the descriptions herein and the accompanying drawings are intended to be illustrative, and not restrictive. Many other implementations will be apparent to those of skill in the art based upon the above description. Such modifications and variations are intended to be included within the scope of the present disclosure. The scope of the present disclosure should, therefore, be considered with reference to the claims, along with the full scope of equivalents to which such claims are entitled. The features illustrated or described in connection with one exemplary embodiment may be combined with the features of other embodiments. In some instances, well-known structures and devices are shown in block diagram form, rather than in detail, in order to avoid obscuring the disclosed subject matter.

What is claimed is:

1. A system comprising:
   one or more processors; and
   one or more memory devices, wherein the one or more memory devices are communicatively coupled to the one or more processors, the one or memory devices storing computer-executable instructions including at least an automated light rigging system, wherein execution of the computer-executable instructions by the one or more processors causes, during runtime, at least one of the one or more processors to configure a light rig of a virtual interactive environment by:
   receiving light rig data of the virtual interactive environment, the light rig data corresponding to a plurality of light objects configured among the virtual interactive environment;
   receiving a lux map corresponding to a light view rendering of the virtual interactive environment, wherein the light view rendering is based at least in part on the light rig data;
   sampling lux values from the lux map across one or more regions of the virtual interactive environment;
   identifying at least one region where the sampled lux map does not conform with a target lux map;
   determining one or more light objects, among the plurality of light objects of the light rig, providing luminance to the at least one region identified; and
   adjusting one or more parameters corresponding to the one or more light objects to alter the luminance at the at least one region identified, wherein the adjustment causes luminance at the at least one region of the virtual interactive environment to conform with the target lux map.

2. The system of claim 1, wherein the target lux map includes data corresponding to optimal lux values for the virtual interactive environment.

3. The system of claim 2, wherein the target lux map is based in part on another virtual interactive environment.

4. The system of claim 3, wherein the determination of the one or more light object is based in part on data from the lux map.

5. The system of claim 4, wherein the adjusting of one or more parameters causes the one or more light objects to change at least one parameter corresponding to location, rotation, scale, direction, and luminous intensity.

6. The system of claim 5, where, in response to identifying at least a first location among the virtual interactive environment where a retrieved lux value does not conform with the target lux map, the light rig data is adjusted to change a number of light objects among the light rig.

7. The system of claim 6, wherein a subsequent rendering of the virtual interactive environment is performed for a subsequent sampling of lux values at the at least one region to validate the adjusting of the one or more parameters.

8. A computer-implemented method to configure a light rig of a virtual interactive environment comprising:
   receiving light rig data of the virtual interactive environment, the light rig data corresponding to a plurality of light objects configured among the virtual interactive environment;
   receiving a lux map corresponding to a light view rendering of the virtual interactive environment, wherein the light view rendering is based at least in part on the light rig data;
   sampling lux values from the lux map across one or more regions of the virtual interactive environment;
   identifying at least one region where the sampled lux map does not conform with a target lux map;
   determining one or more light objects, among the plurality of light objects of the light rig, providing luminance to the at least one region identified; and
   adjusting one or more parameters corresponding to the one or more light objects to alter the luminance at the at least one region identified, wherein the adjustment causes luminance at the at least one region of the virtual interactive environment to conform with the target lux map.

9. The method of claim 8, wherein the target lux map includes data corresponding to optimal lux values for the virtual interactive environment.

10. The method of claim 9, wherein the target lux map is based in part on another virtual interactive environment.

11. The method of claim 10, wherein the determination of the one or more light object is based in part on data from the lux map.

12. The method of claim 11, wherein the adjusting of one or more parameters causes the one or more light objects to change at least one parameter corresponding to location, rotation, scale, direction, and luminous intensity.

13. The method of claim 12, where, in response to identifying at least a first location among the virtual interactive environment where a retrieved lux value does not conform with the target lux map, the light rig data is adjusted to change a number of light objects among the light rig.

14. The method of claim 13, wherein a subsequent rendering of the virtual interactive environment is performed for a subsequent sampling of lux values at the at least one region to validate the adjusting of the one or more parameters.

15. A non-transitory computer readable medium storing instructions that, when executed by one or more processors, causes to perform a method comprising:
   receiving light rig data of a virtual interactive environment, the light rig data corresponding to a plurality of light objects configured among the virtual interactive environment;
   receiving a lux map corresponding to a light view rendering of the virtual interactive environment, wherein the light view rendering is based at least in part on the light rig data;
   sampling lux values from the lux map across one or more regions of the virtual interactive environment;
   identifying at least one region where the sampled lux map does not conform with a target lux map;

determining one or more light objects, among the plurality of light objects of the light rig, providing luminance to the at least one region identified; and adjusting one or more parameters corresponding to the one or more light objects to alter the luminance at the at least one region identified, wherein the adjustment causes luminance at the at least one region of the virtual interactive environment to conform with the target lux map.

16. The non-transitory computer readable medium of claim 15, wherein the target lux map includes data corresponding to optimal lux values for the virtual interactive environment.

17. The non-transitory computer readable medium of claim 16, wherein the target lux map is based in part on another virtual interactive environment.

18. The non-transitory computer readable medium of claim 17, wherein the determination of the one or more light object is based in part on data from the lux map.

19. The non-transitory computer readable medium of claim 18, wherein the adjusting of one or more parameters causes the one or more light objects to change at least one parameter corresponding to location, rotation, scale, direction, and luminous intensity.

20. The non-transitory computer readable medium of claim 19, wherein, in response to identifying at least a first location among the virtual interactive environment where a retrieved lux value does not conform with the target lux map, the light rig data is adjusted to change a number of light objects among the light rig.

* * * * *